(12) United States Patent
Ukai et al.

(10) Patent No.: US 6,787,261 B2
(45) Date of Patent: Sep. 7, 2004

(54) SOLID OXIDE FUEL CELL

(75) Inventors: Kenji Ukai, Tokai (JP); Yasunobu Mizutani, Tokai (JP)

(73) Assignee: Toho Gas Co., Ltd., Nagoya (JP)

( * ) Notice: Subject to any disclaimer, the term of this patent is extended or adjusted under 35 U.S.C. 154(b) by 331 days.

(21) Appl. No.: 09/982,971

(22) Filed: Oct. 22, 2001

(65) Prior Publication Data

US 2002/0076603 A1 Jun. 20, 2002

(30) Foreign Application Priority Data

Oct. 23, 2000 (JP) ........................................ 2000-322670

(51) Int. Cl.$^7$ .......................... H01M 8/12; H01M 4/98
(52) U.S. Cl. .............................. 429/33; 429/40; 429/44
(58) Field of Search .............................. 429/30, 33, 40, 429/41, 44

(56) References Cited

U.S. PATENT DOCUMENTS

| | | | | |
|---|---|---|---|---|
| 4,767,518 A | * | 8/1988 | Maskalick | .................. 204/242 |
| 5,670,270 A | * | 9/1997 | Wallin | .......................... 429/33 |
| 6,428,920 B1 | * | 8/2002 | Badding et al. | ............... 429/30 |

FOREIGN PATENT DOCUMENTS

| | | | | |
|---|---|---|---|---|
| JP | 07-006768 A | * | 1/1995 | ............ H01M/4/86 |
| JP | 2000-340240 A | * | 12/2000 | ............ H01M/8/02 |
| WO | WO 98/43308 | | 10/1998 | |

OTHER PUBLICATIONS

Patent Abstracts of Japan, JP 08/031433A, Feb. 2, 1996.
Patent Abstracts of Japan, JP 08/264187, Nov. 10, 1996.
Hiroaki Tagawa, "Solid Oxide Fuel Cell and the Earth Environment," Agne Shofu Publishing Inc., Tokyo (1998), p. 65, 11.6–12, no month.
K. Eguchi et al., "I–V Characteristics of SOFC with Internal Reforming of $C_1$ and $C_2$ Fuels," Proc. 5$^{th}$ FCDIC Fuel Cell Symposium, Fuel Cell Development Information Center, (FCDIC) (1998), pp. 173–177, no month.

Abulet Abudula et al., "Anodic Reaction Mechanism of Solid Oxide Fuel Cell with Water–Methane Fuel," Denki Kagaku (*Electrochemistry*), vol. 65, No. 10, pp. 852–858 (1997), no month.

Manabu Ihara et al., "Effect of the Steam–Methane Ratio on Reactions Occuring on Ni/Yttria–Stabilized Zirconia Cermet Anodes Used in Solid–Oxide Fuel Cells," *J. Electrochem. Soc.*, vol. 146, No. 7, pp. 2481–2487 (1999), no month.

Teruhisa Horita et al., "Oxidation and Steam Reforming of $CH_4$ on Ni and Fe Anodes under low Humidity Conditions in Solid Oxide Fuel Cells," *J. Electrochem. Soc.*, vol. 143, No. 4, pp. 1161–1168 (1996), no month.

Abulet Abudula et al., "Solid Oxide Fuel Cells for Hydrocarbon Fuels I," Denki Kagaku (*Electrochemistry*), vol. 63, No. 2, pp. 134–139, (1995), no month.

* cited by examiner

Primary Examiner—Patrick Ryan
Assistant Examiner—Tracy Dove
(74) Attorney, Agent, or Firm—Finnegan, Henderson, Farabow, Garrett & Dunner, LLP

(57) ABSTRACT

A solid oxide fuel cell in which the catalytic activity of a fuel electrode is high and in which no poisoning by carbon occurs even when internal reforming is performed under a condition of a low S/C ratio and further in which the time course degradation of the fuel electrode is less when internal reforming is performed. In a solid oxide fuel cell having an oxide ion conductive solid electrolyte, and a fuel electrode and an air electrode connected to both faces thereof, a cermet of a catalyst and of the second solid electrolyte whose oxide ion conductivity is more than or equal to 0.2 S/cm at 1000 ° C. is used as the fuel electrode. More specifically, it is desirable that the second solid electrolyte is scandia-stabilized zirconia (ScSZ) containing 9 to 12 mol % of scandia. In addition, the second solid electrolyte may further be ScSZ containing yttria or ceria less than or equal to 2 mol %. Furthermore, the second solid electrolyte may be a composite material of ScSZ and alumina less than or equal to 2 wt %.

2 Claims, 4 Drawing Sheets

SOLID OXIDE FUEL CELL

BACKGROUND OF THE INVENTION

1. Field of the Invention

The present invention relates to a solid oxide fuel cell, more particularly to a distributed power source and to a solid oxide fuel cell which is used in a cogeneration system or the like and which is suitable for internal reforming solid oxide fuel cell.

2. Description of the Related Art

The solid oxide fuel cell (hereinafter referred to as "SOFC") is a fuel cell in which an oxide ion conductive solid electrolyte is used as an electrolyte. Because, for SOFC, the electrolyte is solid, there is no problem of its dissipation and long life can be expected. Moreover, because the operating temperature which is about 1000° C. is high, the utility value of waste heat is high. Furthermore, because output power density is high, it can also be expected to be compact and of high efficiency.

FIG. 7 shows the schematic block diagram of SOFC. In FIG. 7, SOFC 10 has the structure that a fuel electrode 14 and an air electrode 16 are connected to both faces of an electrolyte 12 to give an electrolyte electrode assembly 18 and that further both the sides are put between gas separators 20 and 22. In general, the oxygen ion conductive solid electrolyte such as yttria stabilized zirconia (hereinafter referred to as "YSZ") is used in the electrolyte 12. Furthermore, generally, a cermet (hereinafter referred to as "Ni-8YSZ") of nickel and YSZ containing 8 mol % of yttria ($Y_2O_3$) is used in a fuel electrode 14 and a complex oxide such as lanthanum strontium manganate ($LaSrMnO_3$) is used in an air electrode 16.

If hydrogen and air are supplied to the fuel electrode 14 and the air electrode 16 of such SOFC 10, respectively, oxygen becomes an ion in the air electrode 16 and is transported to the fuel electrode 14 side through the electrolyte 12 because there is a difference between the oxygen partial pressure $P_1$ on the air electrode 16 side and oxygen partial pressure $P_2$ on the fuel electrode 14 side. Moreover, an oxide ion reaching the fuel electrode 14 reacts with hydrogen to produce water with emission of an electron. Therefore, if load 22 is connected to the fuel electrode 14 and the air electrode 16, the free energy change of a cell reaction can be directly taken out as electrical energy.

Then, in SOFC, because of its high operating temperature, it is possible to perform the so-called "internal reforming" in which hydrocarbon is directly supplied to the fuel electrode to be reformed to hydrogen in a cell body, instead of supplying hydrogen to the fuel electrode. An internal reforming type SOFC has an advantage of high heat efficiency since heat generated inside the cell can be utilized for a reforming reaction with great endothermic reaction. In addition, because an external reforming vessel is unnecessary, there is an advantage that a fuel cell system can be compact.

The reforming reaction of hydrocarbon is a reaction through which hydrocarbon and steam are reacted with each other and that ultimately hydrogen and carbon dioxide are generated. That is, in order to cause a reforming reaction, steam is necessary. If the ratio of steam to carbon in hydrocarbon contained in fuel (hereinafter referred to as "S/C ratio") is small, unreacted hydrocarbon is directly decomposed on a high temperature and carbon is deposited on the fuel electrode. If carbon is deposited at the fuel electrode, a catalyst is poisoned, which causes a reduction in the output of SOFC.

On the other hand, in the case of the internal reforming type SOFC, usually methane is used for fuel. This is due to the fact that since methane is a chief component of natural gas, it ensures safety, inexpensiveness, and ease in storage and supply. In general, in the internal reforming type SOFC using methane for fuel, in order to inhibit deposition of carbon and to obtain a stable output, it is said that the S/C ratio of the order of 2 to 3 is necessary (for example, see (1) "Solid Oxide Fuel Cell And Earth Environment" written by Hiroaki Tagawa, AGNE SHOFU PUBLISHING INC., p65, (2) preliminary reports of the fifth symposium lecture on fuel cell, pp.173–177, (3) Abulet Abudula et al., Electrochemistry, vol. 65, No. 10, pp.852–858 (1997)).

The difference between the open circuit voltage of the fuel cell and terminal voltage when actually carrying electric current, that is, the magnitude of overvoltage is generally affected by the ohmic resistance of an electrolyte, reaction resistance of a fuel electrode, that of an air electrode or the like. In the case of the internal reforming type SOFC, in addition, because the reforming reaction in the fuel electrode appears as resistance, a reduced catalytic activity of the fuel electrode against the reforming reaction causes an increase in the resistance of the fuel electrode and a reduction in the output power density and the generation efficiency of SOFC. Thus, to increase the generating performance of the internal reforming type SOFC, it is important to increase the catalytic activity of the fuel electrode.

However, Ni-8YSZ heretofore, generally used as a fuel electrode material has an insufficient catalytic activity against the reforming reaction. Therefore, a fuel electrode material with higher activity suitable for the internal reforming type SOFC is desired.

Moreover, to perform stable internal reforming, as described above, relatively large S/C ratio is necessary. However, excessive addition of steam causes a reduction in the open circuit voltage of SOFC. Furthermore, excessive addition of steam causes a reduction in SOFC efficiency since it increases auxiliary utility power and since spare energy is necessary for steam generation. On the other hand, if the S/C ratio is made small to avoid this, carbon could be deposited and thus poison the catalyst.

Furthermore, when Ni-8YSZ is used as the fuel electrode of the internal reforming type SOFC, its initial performance is relatively good. However, Ni-8YSZ has a problem that unless it is operated in a condition of a sufficiently high S/C ratio, catalytic activity is time-course degraded and the output power density is reduced when internal reforming operation is continued for many hours.

SUMMARY OF THE INVENTION

The present invention has been made in view of the above circumstances and has an object to overcome the above problems and to improve the power generation performance of the solid oxide fuel cell by improving the catalytic activity of the fuel electrode.

Another object of the present invention is to provide the solid oxide fuel cell in which no poisoning by carbon occurs and stable power generation is possible even when internal reforming is performed under a condition of a low S/C ratio.

And yet, another object of the present invention is to provide the solid oxide fuel cell in which the time course degradation of the fuel electrode is less when internal reforming is performed and which has excellent durability and reliability.

To achieve the objects and in accordance with the purpose of the present invention, as embodied and broadly described herein, in a solid oxide fuel cell having the electrolyte electrode assembly in which the fuel electrode is connected to one face of the first solid electrolyte showing oxide ion conductivity and in which the air electrode is connected to the other face, the fuel electrode comprises a cermet of the catalyst and of the second solid electrolyte whose oxide ion conductivity is more than 0.2 S/cm at 1000° C.

If a material having high oxide ion conductivity is used as the second solid electrolyte forming part of the fuel electrode, more oxide ions are supplied to the triple phase boundary of the fuel electrode and a cell reaction is promoted. Hence, even if internal reforming is performed under a condition of a low S/C ratio, a reforming reaction proceeds independently through water generated by the cell reaction and the deposition of carbon on the fuel electrode is inhibited.

Moreover, the fuel electrode using the second solid electrolyte having high oxide ion conductivity has higher catalytic activity and less time course degradation than conventional fuel electrodes using YSZ. Thus, if this is used as the fuel electrode of the internal reforming type SOFC, the cell performance, durability, and reliability of SOFC are improved.

Additional objects and advantages of the invention are set forth in the following description, are obvious from the description, or may be learned by practicing the invention. The objects and advantages of the invention may be realized and attained by means of instrumentalities and combinations particularly pointed out in the claims.

BRIEF DESCRIPTION OF THE DRAWINGS

The accompanying drawings, which are incorporated in and constitute a part of this specification, illustrate embodiments of the present invention and, together with the description, serve to explain the objects, advantages and principles of the invention. In the drawings.

DETAILED DESCRIPTION OF THE PREFERRED EMBODIMENTS

Figure 1:
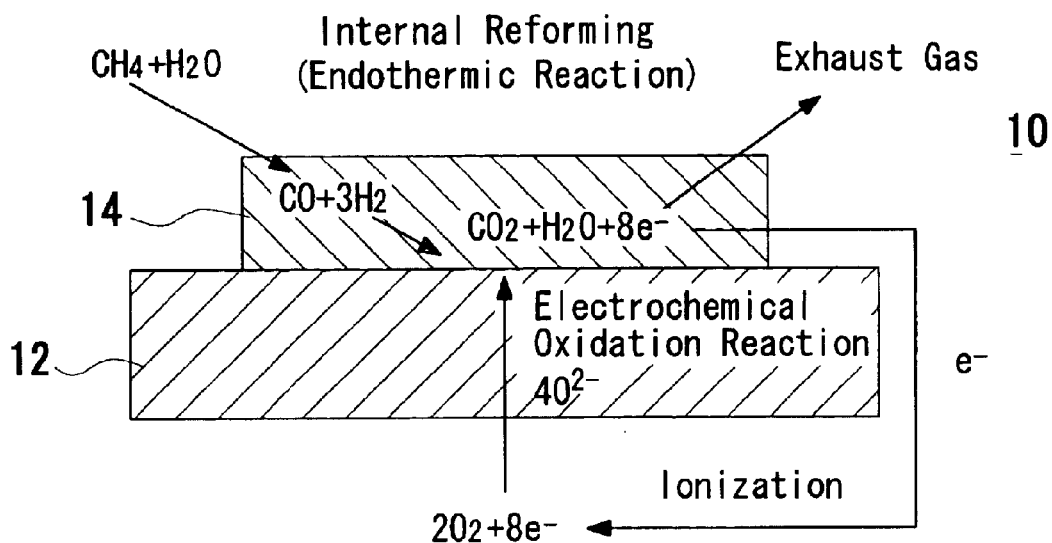
FIG. 1 is the typical view of the power generating reaction of internal reforming type SOFC.

In the following, the embodiments of the present invention will now be explained in detail referring to the accompanying drawings. The present invention is characterized in that, in SOFC having an electrolyte electrode assembly in which the fuel electrode is connected to one face of the first solid electrolyte showing oxide ion conductivity and in which the air electrode is connected to the other face, the cermet of the catalyst and of the second solid electrolyte having high oxide ion conductivity is used as the fuel electrode.

Here, for the catalyst forming part of the fuel electrode, the one having high activity against the cell reaction in the fuel electrode is used. Among such catalysts, specifically, nickel (Ni), cobalt (Co), ruthenium (Ru) or the like are suitable examples. In the present invention, any of the above-mentioned catalysts can be used and there are no specific limitations. The content of the catalyst in the fuel electrode is determined according to the kind of the catalyst employed and the operating conditions of SOFC or the like so that the triple phase boundary is maintained at the operating temperature of SOFC and that necessary characteristics such as predetermined electric conductivity and a coefficient of thermal expansion equivalent to the electrolyte are obtained.

For the second solid electrolyte forming another part of the fuel electrode, the one whose oxide ion conductivity is more than 0.2 S/cm at 1000° C. is used. To further improve the catalytic activity and durability of the fuel electrode, it is particularly preferred that the second solid electrolyte has oxide ion conductivity of more than 0.25 S/cm at 1000° C.

As for the second solid electrolytes meeting these conditions, scandia-stabilized zirconia (hereinafter referred to as "ScSZ") in which scandia ($Sc_2O_3$) is solubilized in zirconia is one of the suitable examples. In this case, it is desirable that the scandia content in ScSZ is 9 to 12 mol %. It is undesirable that the scandia content is less than 9 mol % because the oxide ion conductivity of the fuel electrode is reduced. In addition, it is undesirable that the scandia content is more than 12 mol % because the oxide ion conductivity of the fuel electrode is similarly reduced. It is more desirable that the scandia content in ScSZ is 10 to 11 mol %.

Furthermore, the second solid electrolyte may be ScSZ in which only scandia is solubilized or in which yttria ($Y_2O_3$) or ceria ($CeO_2$) is further added in a very small amount. If yttria is further added to ScSZ, it is desirable that the content is less than or equal to 2 mol %. It is undesirable that the yttria content is more than 2 mol % because the oxide ion conductivity of the fuel electrode is reduced. It is more desirable that the yttria content is 0.5 to 1 mol %.

Moreover, If ceria is further added to ScSZ, it is desirable that its content is less than or equal to 2 mol %. It is undesirable that the ceria content is more than 2 mol % because the oxide ion conductivity of the fuel electrode is reduced. It is more desirable that the ceria content is 0.5 to 1 mol %.

Moreover, the second solid electrolyte may be a composite material of ScSZ and alumina ($Al_2O_3$). If ScSZ and alumina are compounded, it is desirable that the alumina content is less than or equal to 2 wt % for ScSZ. It is undesirable that the alumina content is more than 2 wt % because the oxide ion conductivity of the fuel electrode is reduced. It is more desirable that the alumina content is 0.5 to 1 wt %.

Furthermore, ScSZ may be the one in which one of yttria and ceria is solubilized or in which both of them are solubilized. In addition, alumina may be further compounded with ScSZ in which one or both of yttria and ceria are solubilized.

Moreover, the first solid electrolyte may be the one which shows oxide ion conductivity and is not specifically limited. Suitable examples of the first solid electrolyte are, specifically, YSZ in which 8 to 10 mol % of yttria as a stabilizer is added, calcia-stabilized zirconia (CSZ) in which 9 to 12 mol % of calcia (CaO) as a stabilizer is added, ScSZ in which 9 to 12 mol % of scandia ($Sc_2O_3$) as a stabilizer is added or the like. In particular, ScSZ is suitable as the first solid electrolyte for SOFC since it has high oxide ion conductivity.

Moreover, although SOFC is generally classified roughly into cylinder, plate and mono block layer schemes, the present invention is applicable to all these schemes. That is, the shape of the first solid electrolyte is not specifically limited and may be any of cylindrical, plate, or honeycomb.

Furthermore, for the air electrode, materials which are chemically stable under oxygen atmosphere at high temperatures and which have high electric conductivity are used. As such materials, more specifically, the noble metals such as platinum and complex oxides such as $LaSrMnO_3$, $LaCaMnO_3$, $LaMgMnO_3$, $LaSrCoO_3$, and $LaCaCoO_3$ are mentioned as suitable examples. In the present invention, all above mentioned materials can be employed as the air electrode and are not specifically limited. In addition, the air electrode may be the one which contains only the above mentioned materials or composite materials of the above-mentioned materials and oxide ion conductive solid electrolyte.

Then, the action of SOFC with which the embodiments is concerned will be explained. The reforming reaction of methane is divided into the steam reforming reaction expressed as Chemical Formula 1 and the successive reaction of the water gas shift reaction expressed as Chemical Formula 2. The reforming reaction is an endothermic reaction with great heat absorption and the overall reaction formula is expressed as Chemical Formula 3.

Chemical Formula 1
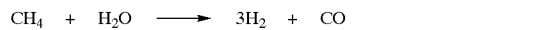

Chemical Formula 2

Chemical Formula 3
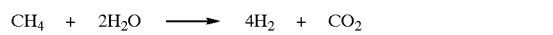

FIG. 1 shows the typical view of the power generating reaction of the internal reforming type SOFC. For example, if a mixed gas of methane whose S/C ratio is 1 and steam is supplied to the fuel electrode 14 of the SOFC 10, the steam reforming reaction expressed in Chemical Formula 1 takes place by the heat energy inside The SOFC 10 and carbon monoxide and hydrogen are generated. The carbon monoxide and hydrogen thus generated are electrochemically oxidized by oxide ions supplied from an electrolyte 12 to give carbon dioxide and steam, respectively, to liberate eight electrons. The electrons thus liberated are supplied to the air electrode site via load not illustrated and are consumed for ionization of oxygen. The power generation of the SOFC 10 is carried out by continuous progress of such a reaction.

Here, in the internal reforming power generation of the SOFC 10, the steam reforming reaction of methane appears as the reaction resistance of the fuel electrode 14. In order to cause the steam reforming reaction of methane, as clarified from Chemical Formula 1, it is necessary that steam should be contained in fuel. Thus, if the S/C ratio in the fuel is small, the reaction of Chemical Formula 1 does not proceed to the right. This causes an increase in the reaction resistance of the fuel electrode 14 and a reduction in the output of the SOFC 10.

Moreover, from Chemical Formula 1, if the S/C ratio is at least 1, thermodynamically methane is decomposed into carbon monoxide and hydrogen. However, in the actual internal reforming power generation of SOFC, the conversion ratio of methane does not reach a thermodynamic equilibrium value to leave unconverted methane. Therefore, in a conventional SOFC, to perform a stable internal reforming, it is necessary that the S/C ratio is of the order of two to three and that steam is excessively added.

On the other hand, in the present invention, as a material for the fuel electrode 14, the second solid electrolyte having high oxide ion conductivity is used and therefore, compared with the conventional fuel electrodes, more oxide ions are supplied to the triple phase boundary of the fuel electrode 14. As a result, a cell reaction is promoted and more water is generated in the fuel electrode. Thus, even if fuel having a low S/C ratio is supplied to the fuel electrode 14, the steam reforming of methane is performed by the water generated through the cell reaction and the cell reaction further proceeds due to the hydrogen thus generated.

That is, the steam reforming reaction of methane proceeds independently by using a material having high oxide ion conductivity for the fuel electrode 14, and the supply of steam is not a rate-determining process. Moreover, the conversion of methane proceeds with independent progress of the steam reforming, inhibiting the deposition of carbon on the fuel electrode 14 resulting from the direct high temperature decomposition of unconverted methane, and thereby preventing the poisoning of a catalyst as well due to the deposited carbon. Thus, according to SOFC with which the present invention is concerned, for example, a high output is obtained in a stable manner even under a condition of very little steam such as 0.03 to 0.25 of the S/C ratio. In addition, since it is unnecessary to add excessive steam, auxiliary utility power is also less and high generating efficiency is obtained.

Furthermore, in a conventional fuel electrode material, the catalytic activity against the reforming reaction of methane is insufficient, which also causes an increase in the reaction resistance of the fuel electrode 14 and causes a reduction in the output of the SOFC 10. On the other hand, the fuel electrode 14 using the second solid electrolyte having high oxide ion conductivity has higher catalytic activity against the reforming reaction of methane than the conventional fuel electrodes. Thus, if this is applied to the internal reforming type SOFC, it is possible to obtain SOFC having excellent generating performance including output density, generating efficiency and the like.

Moreover, the conventional fuel electrodes comprising Ni-8YSZ have the problem that the catalytic activity of the fuel electrode shows time course degradation in the case where internal reforming is continued for many hours unless they are operated under a condition of a sufficiently high S/C ratio. On the contrary, if a material having high oxide ion conductivity is used for the fuel electrode, the time course degradation of the catalytic activity against the reforming reaction of methane is inhibited even if they are operated under a condition of a low S/C ratio. Thus, if this is applied to the fuel electrode of the internal reforming type SOFC, it is possible to obtain SOFC having excellent durability and reliability.

Then, detailed description will now be given to the manufacturing method of SOFC according to the present invention. First, the first solid electrolyte material showing oxide ion conductivity is molded into a predetermined shape and is sintered at a predetermined temperature. To mold the first solid electrolyte material, an optimum method may be used according to the shape of SOFC. For example, to mold in a plate form, any one of the press molding and the tape molding methods or the like may be used. In addition, to mold in a cylindrical or honeycomb form, any one of the extrusion molding and the injection molding methods or the like may be used. Moreover, for the sintering condition of the first solid electrolyte, an optimum temperature is selected according to its composition.

Then, slurry containing a catalyst and the second solid electrolyte is applied to one face of the first solid electrolyte and is sintered to give the fuel electrode. Similarly, slurry containing an air electrode material is applied to the other face of the first solid electrolyte and is sintered to give the air electrode. In addition, a fuel gas introducing means and an oxidizer gas introducing means are attached to the resulting electrolyte electrode assembly to obtain SOFC. Among the application methods for the fuel and air electrodes, the screen printing, doctor blade, brushing, spray, dipping methods and the like are specifically suitable examples, but in the present invention, any of these methods may be used and there are no particular limitations.

EXAMPLES

Example 1

A ScSZ sintered body containing various additives is prepared using an ordinary ceramic process and oxide ion conductivity is measured at 800° C. and 1000° C. In addition, for comparison, an 8YSZ sintered body is prepared and the oxide ion conductivity is measured at 800° C. and 1000° C. The results are shown in Table 1.

TABLE 1

| Composition | Conductivity (S/cm) | |
|---|---|---|
| | 1000° C. | 800° C. |
| (10 mol % $Sc_2O_3$ - 89 mol % $ZrO_2$)99 wt % - $Al_2O_3$ 1 wt % (11S1A) | 0.290 | 0.101 |
| 10 mol % $Sc_2O_3$ - 1 mol % $Y_2O_3$ - 89 mol % $ZrO_2$ (10S1Y) | 0.304 | 0.104 |
| 10 mol % $Sc_2O_3$ - 1 mol % $CeO_2$ - 89 mol % $ZrO_2$ (10S1Ce) | 0.343 | 0.130 |
| 8 mol % $Y_2O_3$ - 92 mol % $ZrO_2$ (8YSZ) | 0.160 | 0.070 |

In the case of the 8YSZ sintered body, the oxide ion conductivity at 1000° C. was 0.160 S/cm and that at 800° C. was 0.070 S/cm.

On the contrary, in the case of the ScSZ sintered body having (11 mol % $Sc_2O_3$-89 mol % $ZrO_2$) 99 wt %-$Al_2O_3$ 1 wt % composition (hereinafter referred to as "11S1A"), the oxide ion conductivity at 1000° C. and 800° C. was 0.290 S/cm and 0.101 S/cm, respectively, which was higher than that of the 8YSZ sintered body.

Similarly, in the case of the ScSZ sintered body having 10 mol % $Sc_2O_3$-1 mol % $Y_2O_3$-89 mol % $ZrO_2$ composition (hereinafter referred to as "10S1Y"), the oxide ion conductivity at 1000° C. and 800° C. was 0.304 S/cm and 0.104 S/cm, respectively. In addition, in the case of the ScSZ sintered body having 10 mol % $Sc_2O_3$-1 mol % $CeO_2$-89 mol % $ZrO_2$ composition (hereinafter referred to as "10S1Ce"), the oxide ion conductivity at 1000° C. and 800° C. was 0.343 S/cm and 0.130 S/cm, respectively.

Example 2

According to the following procedure, SOFC was prepared. First, a binder was added to 11S1A powder to give slurry and a green sheet was prepared using the doctor blade method. Then, this green sheet was sintered at 1600° C. for five hours to obtain an electrolyte sheet.

Then, nickel oxide (NiO) and 10S1Y were weighed at the weight ratio of Ni:10S1Y=4:6, blended with a ball mill for 24 hours, and then dried. The binder was added to this fuel electrode material, applied to one face of the electrolyte plate by the screen printing method, and sintered at 1300° C. to give a fuel electrode. In addition, NiO is reduced to Ni by supplying hydrogen at the time of a generating test and acts as a catalyst.

Next, $La_{0.8}Sr_{0.2}MnO_3$ (hereinafter referred to as "LSM") and 8YSZ were weighed at the weight ratio of LSM:8YSZ= 8:2, blended with a ball mill for 24 hours, and then dried. The binder was added to this air electrode material, applied to the other face of the electrolyte sheet by the screen printing method, and sintered at 1150° C. to give an air electrode. In addition, both sides of the electrode of electrode electrolyte assembly were put between gas separators to obtain SOFC.

Example 3

Except that 10S1Ce was used as a ceramics component which is added to the fuel electrode, according to the procedure similar to the Example 2, SOFC was prepared.

Comparison Example 1

Except that 8YSZ was used as a ceramics component which is added to the fuel electrode, SOFC was prepared according to the procedure similar to the Example 2.

A generating test was performed using SOFC obtained in the Examples 2 and 3, and the Comparison Example 1. A generating temperature was 1000° C. In addition, fuel gas was humidified to predetermined humidity by passing through a bubbling vessel heated with an oil bath. Furthermore, overvoltage (electrode resistance) was measured using the ac impedance method.

Figure 2:
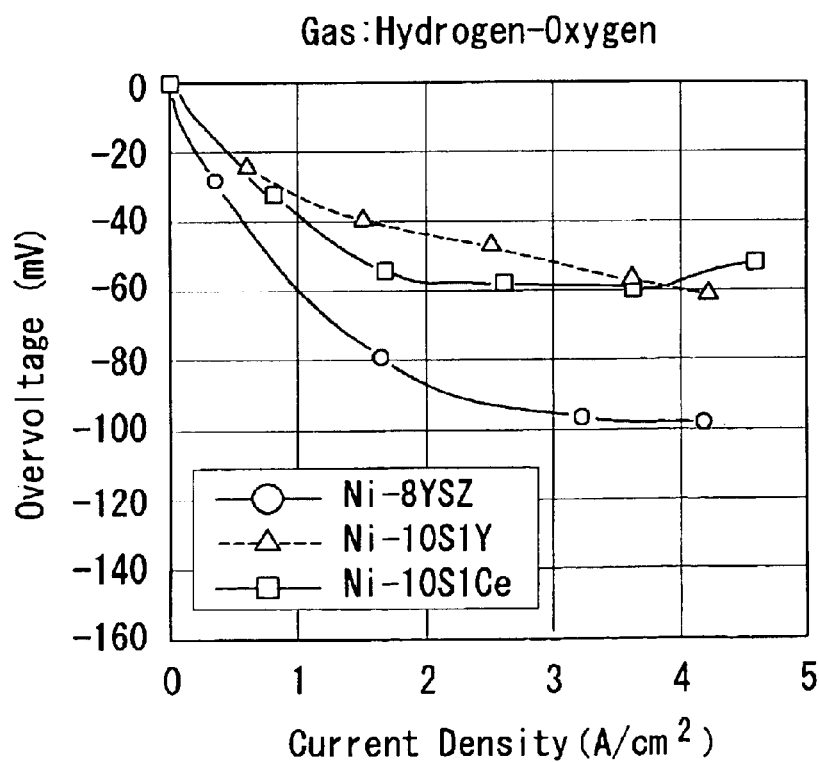
FIG. 2 is a view showing the relation between current density and overvoltage when hydrogen as fuel is supplied to three types of SOFC whose fuel electrode materials are mutually different.

FIG. 2 shows the relation between current density and overvoltage when oxygen is supplied to the air electrode. Overvoltage increased more in SOCF of the Comparison Example 2 using Ni-8YSZ as the fuel electrode than in SOCF of the Example 2 (hereinafter referred to as "Ni-10S1Y") using a cermet of Ni and 10S1Y and SOFC of the Example 3 (hereinafter referred to as "Ni-10S1Ce") using a cermet of Ni and 10S1Ce. This results shows that the catalytic activity of the fuel electrode using ScSZ against hydrogen is higher than that of the fuel electrode using YSZ.

Figure 3:
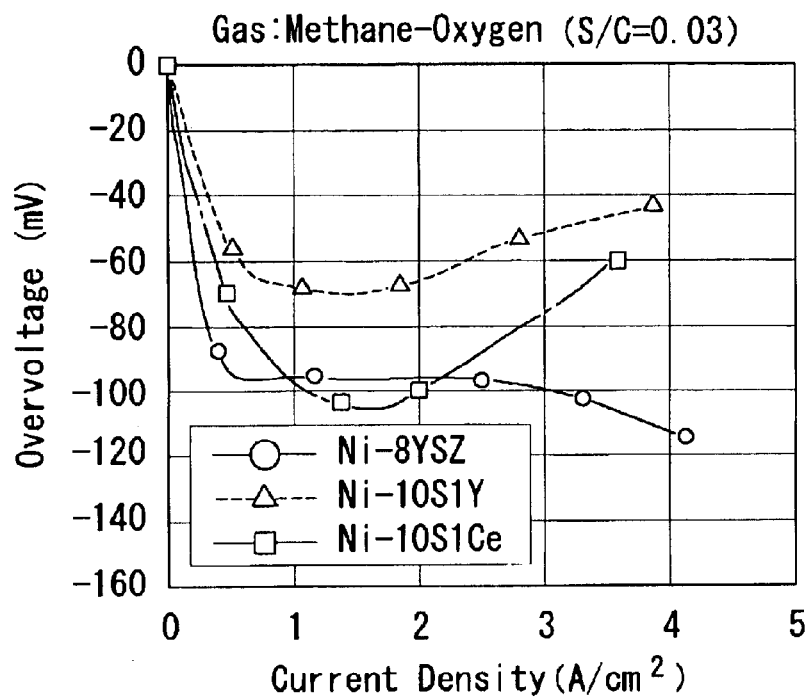
FIG. 3 is a view showing the relation between current density and overvoltage when humidified methane as fuel whose S/C ratio is 0.03 is supplied to the three types of SOFC whose fuel electrode materials are mutually different.

Moreover, FIG. 3 shows the relation between current density and overvoltage when humidified methane whose S/C ratio is 0.03 is supplied to the fuel electrode and oxygen is supplied to the air electrode. In the case of the Comparison Example 1 using Ni-8YSZ as the fuel electrode, the overvoltage reached about −100 mV when the current density is about 0.5 A/cm$^2$. In the region where the current density is up to 0.5 to 3 A/cm$^2$, the overvoltage became approximately constant and if the current density is more than 3 A/cm$^2$, the overvoltage again tended to increase.

In the case of the Comparison Example 1, it is considered that the overvoltage rapidly increased in a low current density region since the reaction on the fuel electrode surface is a rate-determining process because of a very low S/C ratio in fuel. In addition, it is considered that the overvoltage again tends to increase in a high current density region since a process in which a gas component diffuses through the fuel electrode becomes a rate-determining one due to an increase in fuel consumption, which appears as the internal resistance of an electrode.

On the contrary, in the case of SOFC of the Example 2 using Ni-10S1Y as the fuel electrode, overvoltage was wholly small compared with the Comparison Example 1 and the overvoltage was about −60 mV when current density is about 0.5 A/cm². In addition, in the region where the current density is up to 0.5 to 2 A/cm², the overvoltage became approximately constant and if the current density is more than 2 A/cm², the overvoltage tended to decrease.

It is considered that the overvoltage of the Example 2 is smaller than that of the Comparison Example 1 in low and medium current density regions because the steam reforming reaction of methane proceeds independently by using Ni-10S1Y having high oxide ion conductivity for the fuel electrode and because the reaction on the fuel electrode surface thereby resists being a rate-determining process. In addition, it is considered that the overvoltage of the Example 2 conversely decreased in a high current density region because the reforming reaction of methane was promoted compared with the Comparison Example 1 and the internal resistance of the electrode decreased since the catalytic activity of the fuel electrode against the reforming reaction of methane is high and since the partial oxidation reaction of methane expressed as the following Chemical Formula 4 takes places at the same time due to oxide ions supplied through the second solid electrolyte.

Chemical Formula 4

$$CH_4 + (1/2)O_2 \longrightarrow 2H_2 + CO$$

In the case of SOFC of the Example 3 using Ni-10S1Ce as the fuel electrode, although the overvoltage in a medium current density region of 1 to 2 A/cm² increased to values approximately equal to those of the Comparison Example 1, the overvoltage in low and high current density regions showed a tendency approximately similar to that of the Example 2. The cause for increased overvoltage in the medium current density region, of which the details are not clear, is considered as a problem in a process of manufacture, but it was confirmed that generating performance better than the Comparison Example 1 was shown in at least low and high current density regions.

Figure 4:
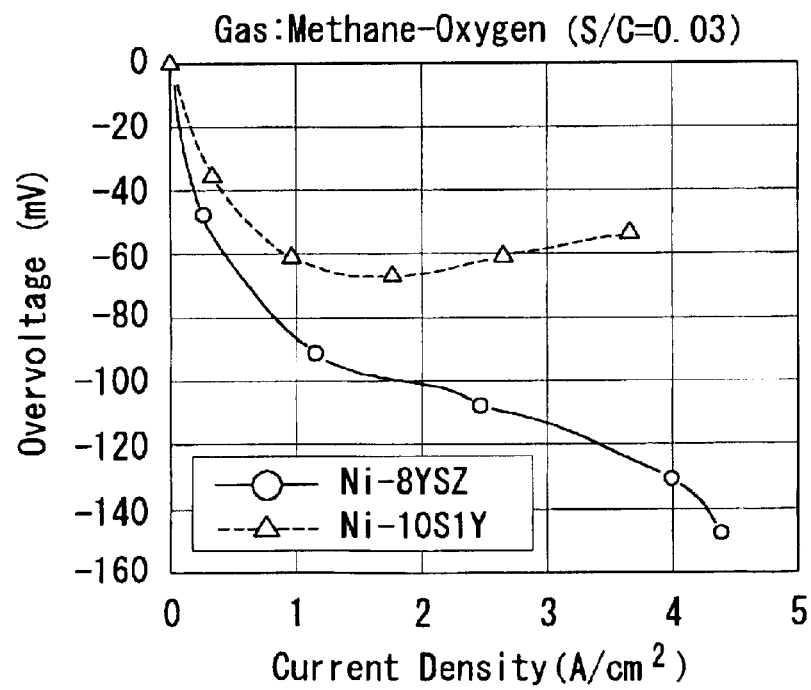
FIG. 4 is a view showing the relation between current density and overvoltage when humidified methane as fuel whose S/C ratio is 0.25 is supplied to two types of SOFC whose fuel electrode materials are mutually different.

Moreover, FIG. 4 shows the relation between current density and overvoltage when humidified methane whose S/C ratio is 0.25 is supplied to the fuel electrode and oxygen is supplied to the air electrode. In the case of SOFC of the Comparison Example 1 using Ni-8YSZ as the fuel electrode, the overvoltage monotonously increased as the current density increases. On the other hand, in the case of SOFC of the Example 2 using Ni-10S1Y as the fuel electrode, the overvoltage is wholly small compared with the Comparison Example 1. In addition, the overvoltage conversely tended to decrease in the high current density region.

It was found from the above results that if ScSZ is used as a fuel electrode material, the catalytic activity against hydrogen is improved. In addition, it was found that if methane is used as fuel, by the occurrence of not only the steam reforming reaction but also the partial oxidation reaction of methane, the reforming reaction of methane becomes active and the overvoltage decreases.

Example 4

Figure 5:
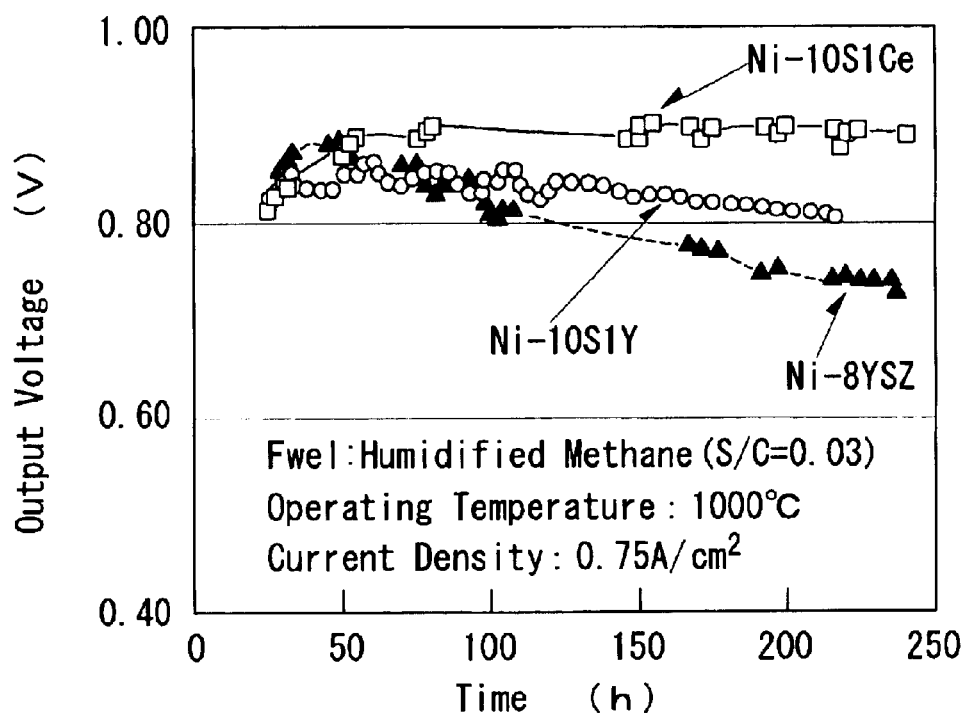
FIG. 5 is a view showing the results of the durability test on the three types of SOFC whose fuel electrode materials are mutually different.

A 250-hour durability test was performed using SOFC prepared in the Examples 2 and 3, and the Comparison Example 1. The operating temperature of SOFC was 1000° C. In addition, humidified methane whose S/C ratio is 0.03 was used for fuel. Furthermore, the current density was maintained at 0.75 A/cm² and the time course changes of output voltage were measured. FIG. 5 shows the results of the durability test.

Figure 6:
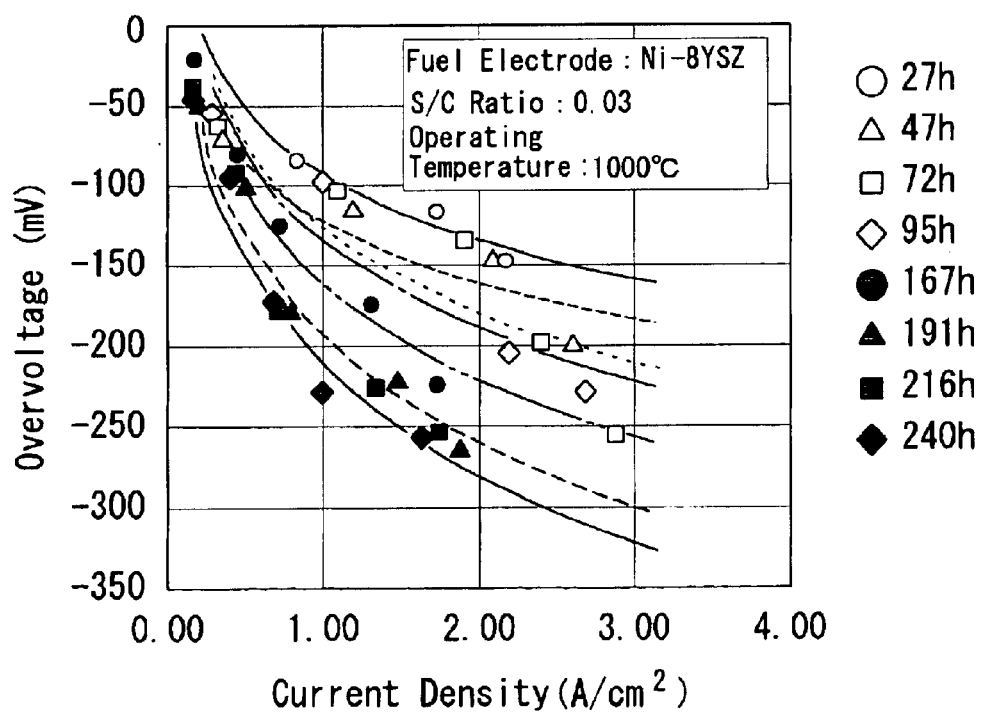
FIG. 6 is a view showing the time course changes of the overvoltage when humidified methane as fuel whose S/C ratio is 0.03 is supplied to the SOFC using Ni-8YSZ for the fuel electrode.
Figure 7:
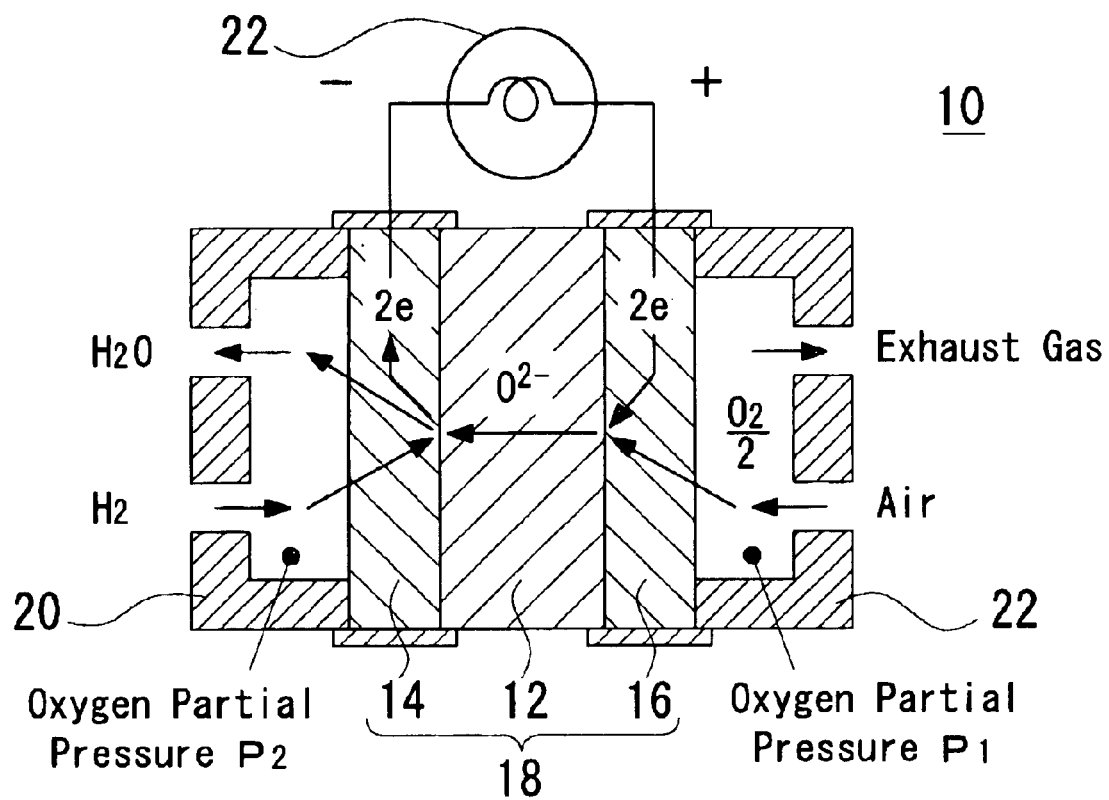
FIG. 7 is a view showing the schematic configuration of the SOFC.

In the case of SOFC of the Comparison Example 1 using Ni-8YSZ for the fuel electrode, the output voltage at the early stage of operation was approximately equal to SOFC of the Examples 2 and 3 and good initial characteristics were obtained. However, the output voltage decreased with a lapse of operating hours. FIG. 6 shows the time course changes of the current density and the overvoltage measured in the SOFC of the Comparison Example 1. It is found from FIG. 6 that for SOFC of the Comparison Example 1, the overvoltage for the same current density increased with a course of time. It is considered that this is because carbon is deposited on the fuel electrode surface and a catalyst is poisoned by carbon through operating for many hours under a low S/C ratio condition.

On the contrary, in the case of SOFC of the Example 2 using Ni-10S1Y for the fuel electrode, the time course changes of the output voltage was slight. In addition, in the case of SOFC of the Example 3 using Ni-10S1Ce for the fuel electrode, there were few time course changes of the output voltage even after 250-hour operation in which internal reforming was performed. This result shows that the catalyst of the fuel electrode is not poisoned by carbon even under a condition of a S/C ratio up to 1.0 through using ScSZ as an electrode material, which ensures stable power generation. Moreover, it is shown that even if internal reforming power generation is performed for many hours, there is no time course degradation of the fuel electrode and no degradation of the catalytic activity of the fuel electrode.

Although the SOFC according to the present invention is especially suitable as the internal reforming type SOFC, the application range of the present invention is not limited to the above-mentioned embodiments. In a similar way, the present invention can also be applied to SOFC using pure hydrogen or reformed gas for fuel. In addition, as well as methane, liquid fuel such as propane, butane, or alcohol can also be used as fuel.

The present invention has the effect that there is no poisoning by carbon even if internal reforming power generation is performed under a condition of a low S/C ratio, ensuring stable power generation, because a cermet of a catalyst and the second solid electrolyte having high oxide ion conductivity is used as the fuel electrode of a solid oxide fuel cell. In addition, it has the effect that the catalytic activity of the fuel electrode is improved, enhancing the generating performance of the solid oxide fuel cell. Moreover, It has the effect that there is little time course degradation of the catalytic activity of the fuel electrode even if internal reforming power generation is performed for many hours, which makes it possible to obtain the solid oxide fuel cell having excellent durability and reliability.

The foregoing description of the preferred embodiments of the invention has been presented for purposes of illustration and description. It is not intended to be exhaustive or to limit the invention to the precise form disclosed, and modifications and variations are possible in the light of the above teachings or may be acquired from practice of the invention. The embodiments chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A solid oxide fuel cell having an electrolyte electrode assembly in which a fuel electrode is connected to one face of a first solid electrolyte showing oxide ion conductivity and in which an air electrode is connected to the other face, wherein the fuel electrode comprises a cermet of a catalyst and of a second solid electrolyte whose oxide ion conductivity is more than or equal to 0.2 S/cm at 1000° C., the second solid electrolyte is scandia-stabilized zirconia containing 9 to 12 mol % of scandia ($Sc_2O_3$) to which greater than zero and less than or equal to 2 mol % of at least one kind of oxide selected from the group consisting of yttria ($Y_2O_3$) and ceria ($CeO_2$) is further added, and the fuel electrode is directly provided with fuel including hydrocarbon and steam.

2. The solid oxide fuel cell according to claim 1, wherein the second solid electrolyte is compounded with less than or equal to 2 wt % of alumina ($Al_2O_3$).

* * * * *